July 7, 1953  H. A. FINKE ET AL  2,644,889
MODE SUPPRESSOR FOR EXTERNAL CAVITY KLYSTRON OSCILLATORS
Filed Feb. 14, 1950
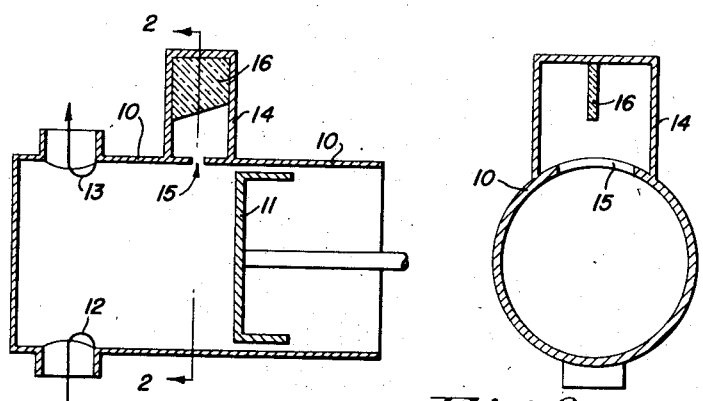
Fig. 1.
Fig. 2.
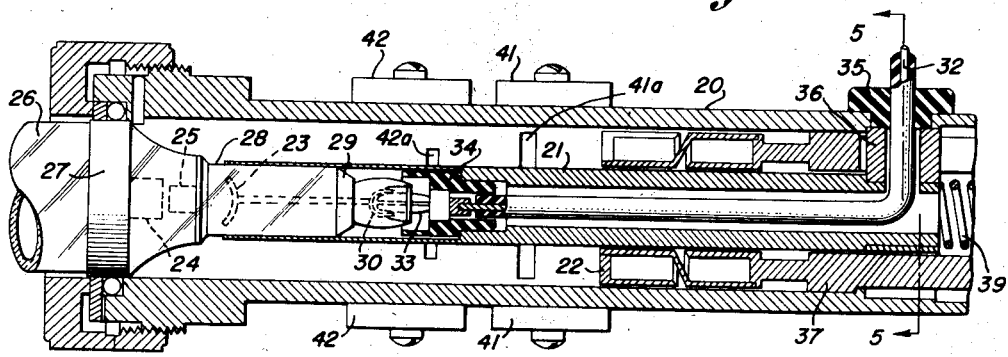
Fig. 3.
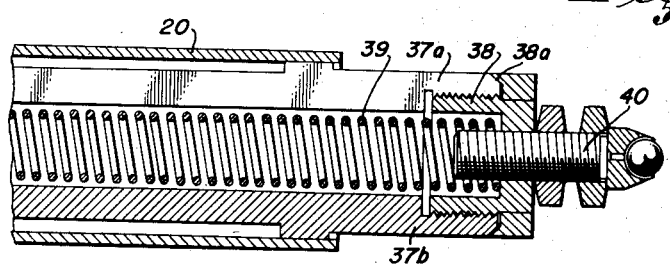
Fig. 4.
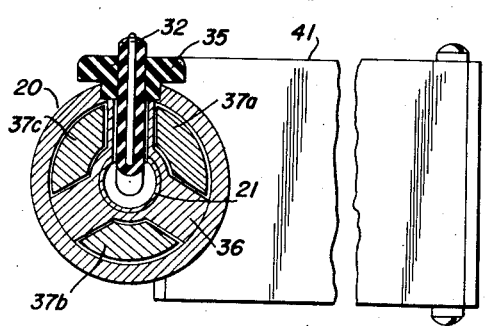
Fig. 5.
INVENTORS
Herbert A. Finke
Abraham H. Sonnenschein
BY Ralph B. Stewart
ATTORNEY Patented July 7, 1953

2,644,889

UNITED STATES PATENT OFFICE 2,644,889

MODE SUPPRESSOR FOR EXTERNAL CAVITY KLYSTRON OSCILLATORS

Herbert Arnold Finke and Abraham Henry Sonnenschein, New York, N. Y., assignors to Polytechnic Research and Development Company Incorporated, Brooklyn, N. Y., a corporation of New York Application February 14, 1950, Serial No. 144,188

6 Claims. (Cl. 250—36)

This invention relates to mode suppressors for use with cavity resonators.

The invention is useful generally in devices having cavity resonators, such as oscillators and wave meters, but it is especially useful for suppressing undesired modes in cavity resonators of the variable frequency type in which the size of the cavity is varied by a movable plunger.

The invention is especially useful in suppressing parasitic modes of the type caused by multifrequency bunching.

Whenever a cavity resonator is to be used in a ¼ wavelength mode or a ¾ wavelength mode, higher frequency modes such as 5/4 or 7/4 wavelengths often appear. By way of a more specific example, when a reflex klystron with an external cavity is used as an oscillator, and the cavity is designed for ¼ wavelength mode operation, the same repeller voltage often produces in the cavity in addition to the ¼ wavelength mode, several higher frequency modes such as ¾, 5/4, 7/4, etc. If, as is often the case, one of these higher frequency modes is the dominant one, the oscillator performance will not be satisfactory unless some means are provided to eliminate the higher modes at any given setting of the cavity.

It has previously been suggested to couple some form of frequency sensitive resistive load to the cavity resonator, in order that the undesired mode will be so heavily damped that oscillation at that frequency will fail to start, and yet the desired mode will be unaffected. Theoretically at least, this solution seems satisfactory, but for wide band operation it is generally necessary to gang tune the damping resistance with the cavity frequency adjustment means so that the former will accurately track the frequency of the undesired mode as the frequency of the desired mode is varied. Practically, this makes for substantial mechanical complexity.

The principal object of this invention is to provide a means for suppressing the undesired higher frequency modes in cavity resonators without affecting the desired low frequency mode.

A further object is to provide a structure for suppressing the higher frequency modes which has a minimum of mechanical complexity.

Still another object is to devise a mode suppressing arrangement for use on a variable resonant cavity for wide band operation.

The above objects are attained by coupling to the resonator a high-pass filter whose characteristics are such that the low frequency desired mode is not affected by this filter, whereas the high frequency undesired mode experiences sufficient additional dissipation that oscillation cannot be sustained at the undesired frequency.

This high-pass filter conveniently takes the form of a wave-guide whose cutoff frequency is higher than the frequency of the desired oscillation, but low enough to allow propagation of the undesired mode. This waveguide filter is coupled to the resonator by any convenient coupling means.

For wide band operation it may be desirable for the waveguide high-pass filter to couple only over the lower part of the frequency range covered by the oscillator to assure that higher desired frequencies are not damped out. If a coupling means such as a slot is utilized to couple the oscillator resonator with a waveguide high-pass filter, the slot may be so positioned that as a result of the motion of the plunger, the slot is exposed to the cavity for all plunger positions corresponding to a given low frequency portion of the range. As the plunger is moved forward for increasing frequency of operation, it moves past the slot until, when fully past, the slot no longer couples to the resonant portion of the cavity, and higher desired frequencies are not damped out.

Suitable embodiments of the invention will now de described in conjunction with the accompanying drawings in which:

Fig. 1 is a schematic showing of the invention as applied to a simple form of variable cavity resonator;

Fig. 2 is a sectional view of Fig. 1 taken on line 2—2;

Fig. 3 is a longitudinal sectional view of the left end portion of a tunable resonant cavity embodying the invention applied to a Raytheon type QK205 reflex klystron;

Fig. 4 is a longitudinal sectional view of the right hand end portion of the structure shown in Fig. 3; and Fig. 5 is a section taken on line 5—5 of Fig. 3.

The basic principles of the invention are best understood by reference to Fig. 1. This figure shows a cavity resonator of the type used in a wave meter and comprising a conducting cylinder 10 and adjustable tuning means in the form of a plunger 11, which does not contact the cylinder 10 but serves to vary the length and hence the resonant frequency of the cavity. Radio frequency power may be supplied and taken off by means of the coupling loops 12 and 13. Assuming that the resonator is designed for ¼ wavelength operation, other modes such as ¾, 5/4 etc. may appear. In order to provide proper damping for these undesired modes, a high-pass filter which may conveniently take the form of a waveguide section 14 is coupled to the resonant cavity. Coupling may be by means of a relatively narrow slot 15 arranged transversely of the axis of cylinder 10. The waveguide section in order to pass only the undesired higher frequency modes must be dimensioned to have a cutoff frequency higher than the desired mode but lower than the undesired modes. Suitable loss-producing, resistance material 16 is positioned within the waveguide section and electrically connected thereto to absorb the undesired modes. The resistance also serves the function of providing a proper impedance termination for the waveguide section. One suitable form of resistance suitable for use at 16 is that a dielectric plate, such as glass, having a thin metallic film on one or both faces thereof.

For very wide band operation it is desirable to couple more than one of these waveguide sections to the resonator. Those having the highest cut-off frequency would be located nearest to that end of the cavity which is approached by the tuning means as it is adjusted for the highest frequencies. Those having lower cut off frequencies will be located at points near the other end of the cavity. In this way, as frequency is increased, the high pass filters having lower cut-off frequencies are de-coupled or taken out of the circuit as the tuning means passes their points of coupling, and therefore do not attenuate the desired modes at higher frequency settings of the resonant cavity.

Figures 3, 4 and 5 show a specific embodiment of the invention in which two high-pass filters in the form of rectangular wave guide sections are coupled to a coaxial type cavity resonator which serves as the external resonant cavity for a Raytheon type QK205 reflex klystron oscillator tube. The sectional view of Figure 3 is taken at right angles to the axes of the two filters.

The outer and inner conductors of the coaxial resonator are designated 20 and 21 respectively. The cavity is tuned by movements of an S type plunger 22, which travels between but does not contact either conductor. Only one end of the klystron is shown in the drawing but this end includes the repeller electrode 23, and grids 24 and 25, the latter defining the radio frequency interaction gap. Connection to grid 24 is brought out through the glass wall 26 of the tube in the form of a metallic contact ring 27. The outer conductor 20 of the resonator makes electrical contact with this ring as shown. Grid 25 is connected to a hollow metallic cylinder 28 which extends longitudinally from the glass envelope. The inner conductor 21 of the resonant cavity surrounds this cylinder and is in electrical contact therewith. The repeller electrode 23 is concentrically supported within the cylinder 28 by means of the glass insulator 29. The latter has a cup shaped depression with a metallic cup 30 therein which is connected to the repeller electrode. The D. C. voltage for the repeller electrode is supplied through the insulated conductor 32 which terminates in a banana plug 33. The latter engages metal cup 30 and is supported by insulating member 34 which frictionally engages the inner surface of inner conductor 21. The insulated conductor 32 enters resonant cavity through an insulating bushing 35 and passes into the tubular inner conductor 21 through a radial opening in one arm of a 3-arm spider 36 which supports the right end of conductor 21 centered with respect to conductor 20. A suitable power take-off loop may be coupled to the resonator cavity near the left end thereof.

The carrier for the tuning plunger 22 comprises a tubular member 37 which is slotted throughout the major portion of its length by three equally spaced slots to form three longitudinal segments 37a, 37b and 37c which straddle the legs of spider 36 as shown in Fig. 5. A threaded plug 38 is screwed into a threaded bore formed in the right end of tube 37 and is provided with an enlarged circular head having a circular flange projecting from the front face thereof. The circular flange has a conical inner surface 38a which engages the beveled ends of tube segments 37a, 37b and 37c to hold these segments in clamped relation. A compression spring 39 is arranged within tube 37 and normally urges the tube outwardly. A screw 40 having a ball bearing mounted on its head has threaded engagement with plug 38, and the tube 37, and plunger 22, may be moved inwardly of the resonator cavity by any suitable arrangement acting on screw 40.

In order to suppress high frequency undesired modes, two high-pass filters comprising rectangular waveguide sections 41 and 42 are coupled to the resonant cavity and extend radially therefrom as shown in Figs. 3 and 5. Filter sections 41 and 42 are coupled to the cavity by means of relatively narrow slots 41a and 42a formed in the wall of cylindrical conductor 20 and transversely thereof. It will be noted that these slots are of different sizes since they are to pass energy of different modes. They are made large enough to allow sufficient energy of the undesired modes to pass into the filter to suppress oscillations at these modes, but they should not be so large as to produce serious asymmetry in the main cavity. For any given cavity arrangement, the proper size of the coupling slot may be determined empirically. Each of these waveguide sections contains energy dissipating resistive material substantially as shown at 16 in Fig. 1 to absorb the undesired modes.

When the resonant cavity is tuned for the lowest frequency, i. e. when the tuning plunger 22 is moved to its extreme right hand position as shown in the drawing, both waveguide sections are coupled to the resonant cavity. As long as they are dimensioned to have a cutoff frequency higher than the desired resonant mode but lower than higher frequency undesired modes, for this setting of the cavity only the undesired modes will be propagated through the waveguide sections where they will be absorbed by the resistance material therein.

As a practical matter, waveguide section 42 must have a higher cutoff frequency than waveguide 41. This will be apparent from a consideration of broadband operation of the resonator. The oscillator will operate at its lowest frequency when the tuning plunger is in its extreme right hand position as shown in the drawing. As it is moved to the left, the resonant frequency (desired mode) may increase to a point which is higher than the cutoff frequency of waveguide 41. This means that waveguide 41 must be located at a point such that the tuning means will completely cover the slot 41a for all settings of the tuning plunger which would result in oscillator frequencies the desired mode of which is higher in frequency than the cutoff frequency of the waveguide. With the tuning plunger in a position which covers the slot coupling 41a to waveguide 41, waveguide 42 remains coupled to the cavity and it must be dimensioned to have a cutoff frequency which will bear the same general relation to the frequency of the desired mode at this setting of the tuning plunger as waveguide 41 bears at the lower frequency setting.

From the foregoing it should be apparent that the number of waveguide sections may be increased commensurately with the desired band width over which the resonant cavity is designed to operate. It will be further apparent that where a plurality of waveguides are used, they must be so arranged along the path of travel of the tuning means that those having the lower cutoff frequencies will be successively decoupled as the tuning means is advanced. Thus it can be seen that for any desired band width for any given resonant cavity, the invention can be applied to absorb the undesired higher frequency modes for any setting of the cavity tuning means without disturbing the desired mode. The net result is greatly improved efficiency and general performance of cavity resonators in a wide variety of applications. The invention is by no means limited to oscillator cavity resonators but is equally well suited for use in connection with frequency meters and other similar cavity applications.

We claim:

1. A variable frequency cavity resonator comprising a hollow cylinder having a piston mounted at one end for movement within said cylinder, to vary the frequency of said cavity over a predetermined range, a waveguide section coupled to said cavity by an aperture in the wall thereof at a point within the range of movement of said piston, whereby the coupling of energy to said section is cut off by said piston at a predetermined point in its range of movement, said waveguide section being dimensioned to have a cut-off frequency higher than the desired resonant mode but lower than higher frequency undesired modes whereby only the undesired modes are propagated through said waveguide section, and energy dissipating material positioned within said waveguide section to absorb said undesired modes.

2. A variable frequency cavity resonator comprising a hollow cylinder having a piston mounted at one end for movement within said cylinder, to vary the frequency of said cavity over a predetermined range, a plurality of waveguide sections coupled to said cylinder by apertures in the cylinder wall at spaced points along the axis thereof and within the range of movement of said piston whereby the coupling of energy to said sections is progressively cut off by said piston in its movement from its outer to its inner position, said waveguide sections being dimensioned to have cut off frequencies which progressively decrease from the end of said cylinder opposite said piston.

3. A variable frequency oscillation generator comprising, in combination, an electron tube provided with a pair of spaced electrodes forming an interaction gap, a co-axial resonator formed of an outer tubular conductor and an inner conductor co-axially arranged within said outer conductor, said conductors being connected at one end of said resonator to said gap electrodes, an annular piston mounted in the other end of said resonator for sliding movement axially thereof in the annular space between said conductors to vary the length of the cavity in said resonator, and a waveguide section coupled to the cavity of said resonator by a slot formed in the wall of said outer conductor at a point within the range of movement of said piston, said waveguide section having a cutoff frequency higher than the desired resonant mode but lower than higher frequency undesired modes.

4. An oscillation generator according to claim 3 wherein said electron tube includes a repeller electrode adjacent said gap electrodes and the inner conductor of said resonator comprises a hollow conductor, and means including an insulated conductor mounted within said hollow inner conductor for supplying potential to said repeller electrode.

5. An oscillation generator according to claim 4, and including a spider supporting the outer end of said hollow inner conductor within said outer conductor, a tubular member supporting said piston on one end thereof and having longitudinal slots through which the arms of said spider extend, one arm of said spider being hollow and providing a radial passage for said insulated conductor.

6. Mode suppressor apparatus comprising in combination, a variable frequency cavity resonator comprising a hollow cylinder effectively closed at one end and having a piston mounted at the other end for movement within said cylinder to vary the frequency of said cavity over a predetermined range, a plurality of waveguide sections coupled to said cylinder by apertures in the wall at spaced points along the axis thereof and within the range of movement of said piston, whereby the coupling of energy to said sections is progressively cut off by said piston in its movement from its outer position to its inner position, said waveguide sections being dimensioned to have cutoff frequencies which progressively decrease from the closed end of said cylinder and which are higher than the desired mode but lower than higher frequency undesired modes whereby only the undesired modes will be propagated through said waveguide sections, and energy dissipating material disposed within each of said waveguide sections to absorb said undesired modes.

HERBERT ARNOLD FINKE.
ABRAHAM HENRY SONNENSCHEIN.

References Cited in the file of this patent

UNITED STATES PATENTS

| Number | Name | Date |
|---|---|---|
| 2,425,345 | Ring | Aug. 12, 1947 |
| 2,473,448 | Rieke | June 14, 1949 |
| 2,504,329 | Heising | Apr. 18, 1950 |
| 2,514,779 | Martin | July 11, 1950 |

FOREIGN PATENTS

| Number | Country | Date |
|---|---|---|
| 590,302 | Great Britain | July 14, 1947 |